(12) United States Patent
Pretty et al.

(10) Patent No.: US 11,511,874 B2
(45) Date of Patent: Nov. 29, 2022

(54) LINKAGE(S) BETWEEN INNER AND OUTER COWL DOORS

(71) Applicant: Rohr, Inc., Chula Vista, CA (US)

(72) Inventors: Sean Pretty, Jamul, CA (US); Erik Linde, Coronado, CA (US); Martin C. Bell, El Cajon, CA (US); Jihad Ramlaoui, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 8 days.

(21) Appl. No.: 17/037,896

(22) Filed: Sep. 30, 2020

(65) Prior Publication Data

US 2021/0094697 A1    Apr. 1, 2021

Related U.S. Application Data

(60) Provisional application No. 62/907,813, filed on Sep. 30, 2019.

(51) Int. Cl.
*B64D 29/08* (2006.01)
*B64D 29/06* (2006.01)
*F01D 25/24* (2006.01)

(52) U.S. Cl.
CPC .............. *B64D 29/08* (2013.01); *B64D 29/06* (2013.01); *F01D 25/24* (2013.01); *F05D 2220/323* (2013.01); *F05D 2230/72* (2013.01); *F05D 2240/14* (2013.01); *F05D 2260/57* (2013.01)

(58) Field of Classification Search
CPC .............. B64D 29/06; F05D 2220/323; F05D 2230/72; F05D 2240/14; F05D 2260/57; F01D 25/24
See application file for complete search history.

(56) References Cited

U.S. PATENT DOCUMENTS

| 4,174,609 | A | | 11/1979 | Legrand | |
|---|---|---|---|---|---|
| 4,385,423 | A | | 5/1983 | Vermilye | |
| 4,585,189 | A | * | 4/1986 | Buxton | B64D 29/08 |
| | | | | | 244/129.4 |
| 4,679,750 | A | * | 7/1987 | Burhans | B64D 29/06 |
| | | | | | 244/129.4 |
| 4,683,717 | A | * | 8/1987 | Naud | B64D 29/08 |
| | | | | | 60/226.1 |
| 9,221,545 | B2 | * | 12/2015 | Popescu | B64D 29/08 |
| 9,650,917 | B2 | * | 5/2017 | Stewart | B64D 29/08 |
| 9,885,253 | B2 | * | 2/2018 | Soria | F01D 25/24 |
| 10,745,140 | B2 | * | 8/2020 | Peyron | B64D 29/06 |

(Continued)

FOREIGN PATENT DOCUMENTS

| GB | 2483908 | A | * | 3/2012 | ............ B64D 29/08 |
|---|---|---|---|---|---|
| GB | 2483908 | B | | 7/2012 | |
| WO | 2019129961 | A1 | | 7/2019 | |

OTHER PUBLICATIONS

EP search report for EP20199457.1 dated Feb. 25, 2021.

*Primary Examiner* — Brian P Wolcott
(74) *Attorney, Agent, or Firm* — Getz Balich LLC (57) ABSTRACT

An assembly is provided for an aircraft propulsion system. The assembly includes a fixed structure, an inner cowl door and an outer cowl door. The inner cowl door is pivotally connected to the fixed structure. The outer cowl door is pivotally connected to the fixed structure. The outer cowl door is radially outboard of and overlaps the inner cowl door. The linkage extends between and is movably connected to the inner cowl door and the outer cowl door.

18 Claims, 8 Drawing Sheets

(56) References Cited

U.S. PATENT DOCUMENTS

| | | |
|---|---|---|
| 2004/0068978 A1 | 4/2004 | Lair |
| 2015/0121895 A1 | 5/2015 | Suciu |
| 2015/0275766 A1 | 10/2015 | Kohlenberg |
| 2016/0363097 A1 | 12/2016 | Foutch |
| 2018/0171664 A1 | 6/2018 | Frommer |
| 2018/0362173 A1 | 12/2018 | Delaney |
| 2019/0257269 A1 | 8/2019 | Rambaud |

* cited by examiner

LINKAGE(S) BETWEEN INNER AND OUTER COWL DOORS

CROSS-REFERENCE TO RELATED APPLICATIONS

This application claims priority to U.S. Provisional Patent Application No. 62/907,813 filed Sep. 30, 2019, which is hereby incorporated herein by reference in its entirety.

BACKGROUND

1. Technical Field

This disclosure relates generally to an aircraft propulsion system and, more particularly, to operatively linking components of a nacelle together.

2. Background Information

A modern aircraft propulsion system includes a nacelle for housing a gas turbine engine. The nacelle may include various cowl doors, which doors are pivotally mounted to provide access to the gas turbine engine and/or accessories configured with the gas turbine engine. While known nacelles and cowl doors have various advantages, there is still room in the art for improvement.

SUMMARY OF THE DISCLOSURE

According to an aspect of the present disclosure, an assembly is provided for an aircraft propulsion system. The assembly includes a fixed structure, an inner cowl door and an outer cowl door. The inner cowl door is pivotally connected to the fixed structure. The outer cowl door is pivotally connected to the fixed structure. The outer cowl door is radially outboard of and overlaps the inner cowl door. The linkage extends between and is movably connected to the inner cowl door and the outer cowl door. The linkage is arranged proximate the fixed structure.

According to another aspect of the present disclosure, another assembly is provided for an aircraft propulsion system. The assembly includes a first structure, a nacelle inner structure, a nacelle outer structure and a linkage. The nacelle inner structure is configured as or otherwise includes an inner structure component. The inner structure component is pivotally connected to the first structure at a pivot point. The inner structure component is configured to pivot about the pivot point between an inner structure component closed position and an inner structure component open position. The nacelle outer structure extends circumferentially about and overlaps the nacelle inner structure. The nacelle outer structure is configured as or otherwise includes an outer structure component. The outer structure component is pivotally connected to the first structure. The outer structure component is configured to pivot between an outer structure component closed position and an outer structure component open position. The linkage extends between and is pivotally connected to the inner structure component at an inner connection point and the outer structure component at an outer connection point. The inner connection point is located circumferentially along the inner structure component between a circumferential midpoint of the inner structure component and the pivot point.

According to still another aspect of the present disclosure, another assembly is provided for an aircraft propulsion system. The assembly includes a first structure, a nacelle inner structure, a nacelle outer structure and a linkage. The nacelle inner structure is configured as or otherwise includes an inner structure component. The inner structure component is pivotally connected to the first structure. The inner structure component is configured to pivot between an inner structure component closed position and an inner structure component open position. The nacelle outer structure extends circumferentially about and overlaps the nacelle inner structure. The nacelle outer structure is configured as or otherwise includes an outer structure component. The outer structure component is pivotally connected to the first structure at a pivot point. The outer structure component is configured to pivot about the pivot point between an outer structure component closed position and an outer structure component open position. The linkage extends between and is pivotally connected to the inner structure component at an inner connection point and the outer structure component at an outer connection point. The outer connection point is located circumferentially along the outer structure component between a circumferential midpoint of the outer structure component and the pivot point.

The inner structure component is configured as or otherwise includes an inner cowl door.

The outer structure component is configured as or otherwise includes an outer cowl door.

The first structure is configured as or otherwise includes a fixed structure.

The inner cowl door may extend circumferentially between a first end and a second end with a midpoint halfway circumferentially along the inner cowl door between the first end and the second end. The inner cowl door may be pivotally connected to the fixed structure at the first end. The linkage may be movably connected to the inner cowl door at a connection point circumferentially between the midpoint and the first end.

The connection point may be circumferentially closer to the first end than the midpoint.

The outer cowl door may extend circumferentially between a first end and a second end with a midpoint halfway circumferentially along the outer cowl door between the first end and the second end. The outer cowl door may be pivotally connected to the fixed structure at the first end. The linkage may be movably connected to the outer cowl door at a connection point circumferentially between the midpoint and the first end.

The connection point may be circumferentially closer to the first end than the midpoint.

The linkage may be pivotally connected to the inner cowl door. In addition or alternatively, the linkage may be pivotally connected to the outer cowl door.

The linkage may be configured to push against and thereby open the outer cowl door as the inner cowl door is opened.

The linkage may be configured to pull against and thereby open the inner cowl door as the outer cowl door is opened.

The assembly may also include a lock configured to lock a position of the linkage.

The linkage may have a fixed length.

The linkage may have a variable length.

The assembly may also include an actuator configured to push open the inner cowl door.

The assembly may also include an actuator configured to pull open the outer cowl door.

A portion of a bypass flowpath within the aircraft propulsion system may be formed by and may extend radially between the inner cowl door and the outer cowl door.

The assembly may also include a nacelle outer structure and a nacelle inner structure. The nacelle outer structure may be configured as or otherwise include the outer cowl door. The nacelle inner structure may be configured as or otherwise include the inner cowl door.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
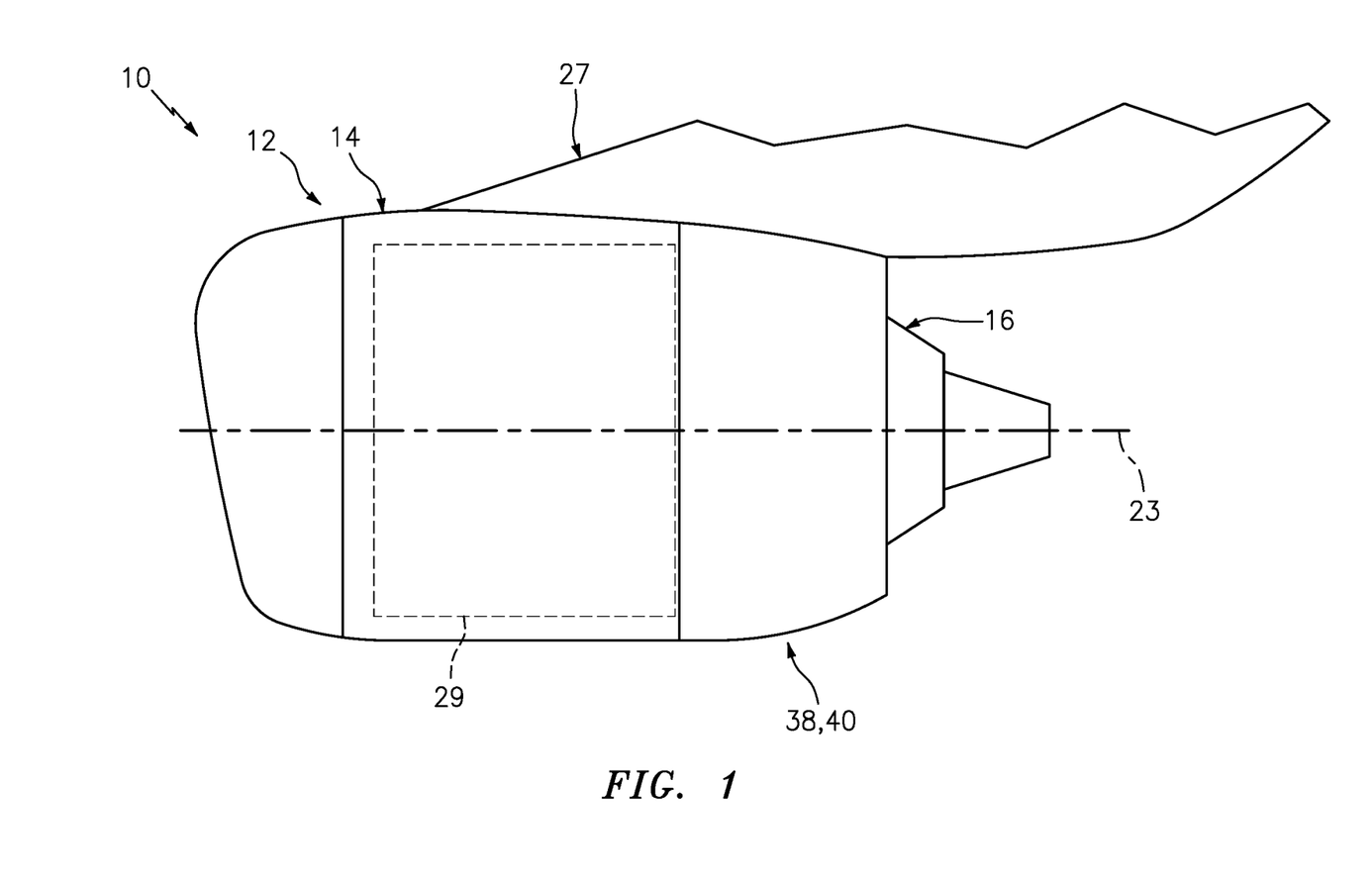
FIG. 1 is a side illustration of an aircraft propulsion system.

FIG. 1 illustrates an aircraft propulsion system 10 for an aircraft such as, but not limited to, a commercial airliner or a cargo plane. The propulsion system 10 includes a nacelle 12 and a gas turbine engine. This gas turbine engine may be configured as a high-bypass turbofan engine. Alternatively, the gas turbine engine may be configured as any other type of gas turbine engine capable of propelling the aircraft during flight.

The nacelle 12 is configured to house and provide an aerodynamic cover for the gas turbine engine. The nacelle 12 of FIG. 1 includes a nacelle outer structure 14 and a nacelle inner structure 16, which inner structure 16 may sometimes be referred to as an inner fixed structure (IFS).

Figure 2:
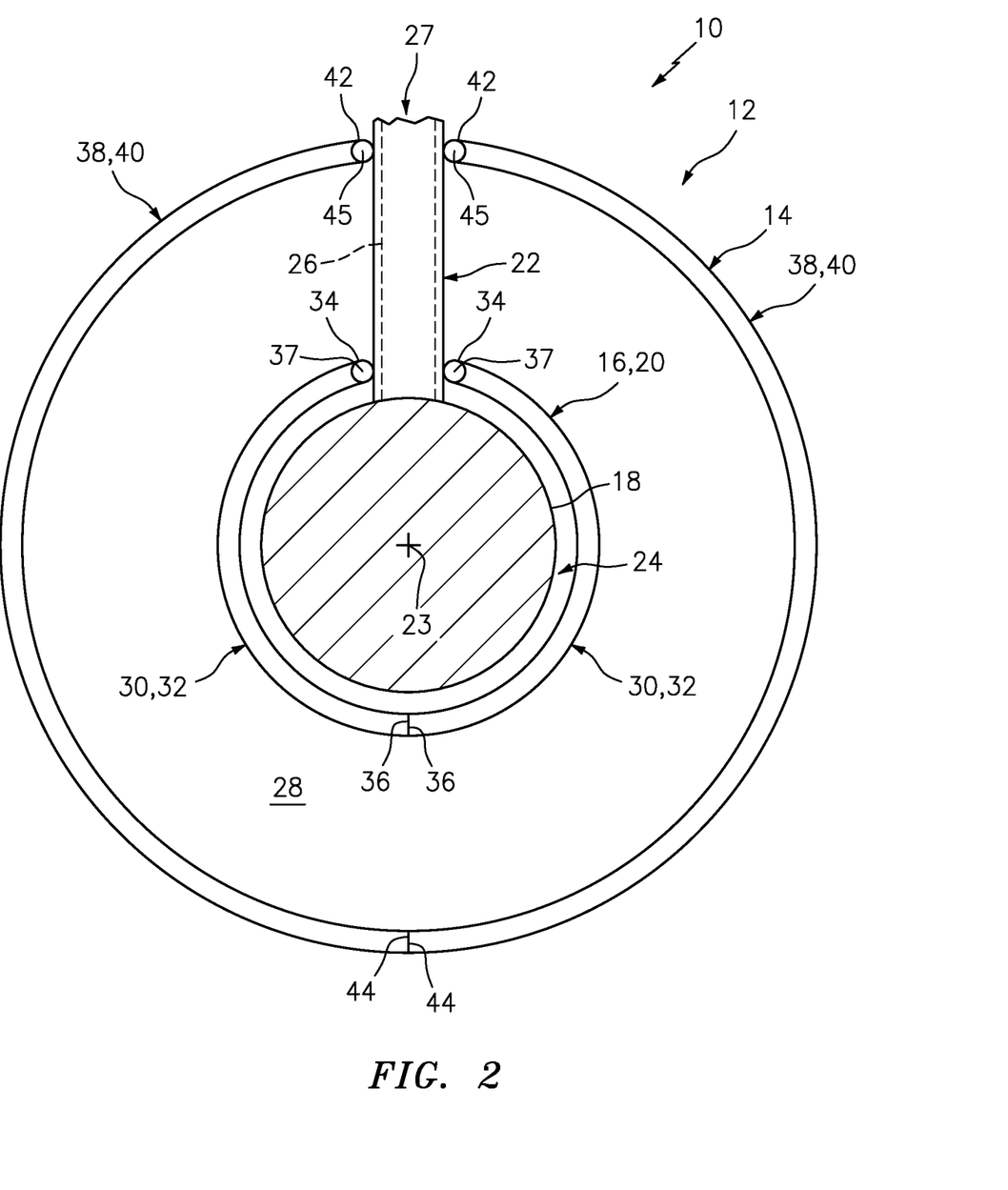
FIG. 2 is a cross-sectional illustration of the aircraft propulsion system with cowl doors in closed positions.

Referring to FIG. 2, the inner structure 16 covers a core 18 of the gas turbine engine. This engine core 18 may include a compressor section, a combustor section and a turbine section.

The inner structure 16 includes an inner barrel 20 and at least one bifurcation structure 22; e.g., an upper bifurcation cowl. The inner barrel 20 may be a generally cylindrical and/or barrel-shaped cowl that extends circumferentially around and axially along the engine core 18 and/or an axial centerline 23 of the aircraft propulsion system 10 and/or its gas turbine engine, which axial centerline 23 may be coaxial with a rotational axis of the gas turbine engine. The inner barrel 20 at least partially forms an internal compartment 24 (e.g., a core compartment) within the nacelle 12. This internal compartment 24 at least partially or completely houses the engine core 18. The engine core 18 is thereby arranged within the internal compartment 24. The bifurcation structure 22 provides an aerodynamic housing for a pylon 26 which mounts the aircraft propulsion system 10 to the aircraft. The bifurcation structure 22 extends radially between the inner barrel 20 and the outer structure 14. The bifurcation structure 22 and/or the pylon 26 may each be configured as part of a fixed structure 27 of the aircraft propulsion system 10.

The outer structure 14 covers a fan section (not shown) of the gas turbine engine; e.g., the outer structure 14 covers a fan case 29 of the fan section; see FIG. 1. The outer structure 14 covers at least a forward portion of the inner structure 16 and its inner barrel 20 so as to form a bypass duct and an associated bypass flowpath 28 radially between the structures 14 and 16. The outer structure 14 may also be configured with a thrust reverser for redirecting airflow from the bypass flowpath 28 out of the nacelle 12 in a forward and outward direction. The present disclosure, however, is not limited to the foregoing exemplary general nacelle configuration.

Briefly, the bypass duct of FIG. 2 is configured as an O-Duct. The term "O-duct" may describe a duct through which only a single bifurcation extends between and connects a nacelle outer structure and a nacelle inner structure. By contrast, the term "C-Duct" or "D-duct" may describe a duct through which two bifurcations (e.g., an upper bifurcation and a lower bifurcation) extends between and connect a nacelle outer structure and a nacelle inner structure. Of course, although the exemplary duct shown in FIG. 2 is an O-duct, the present disclosure is not limited to any particular duct configurations. In particular, the present disclosure also contemplates the nacelle 12 having a C-duct or a D-duct.

Figure 3:
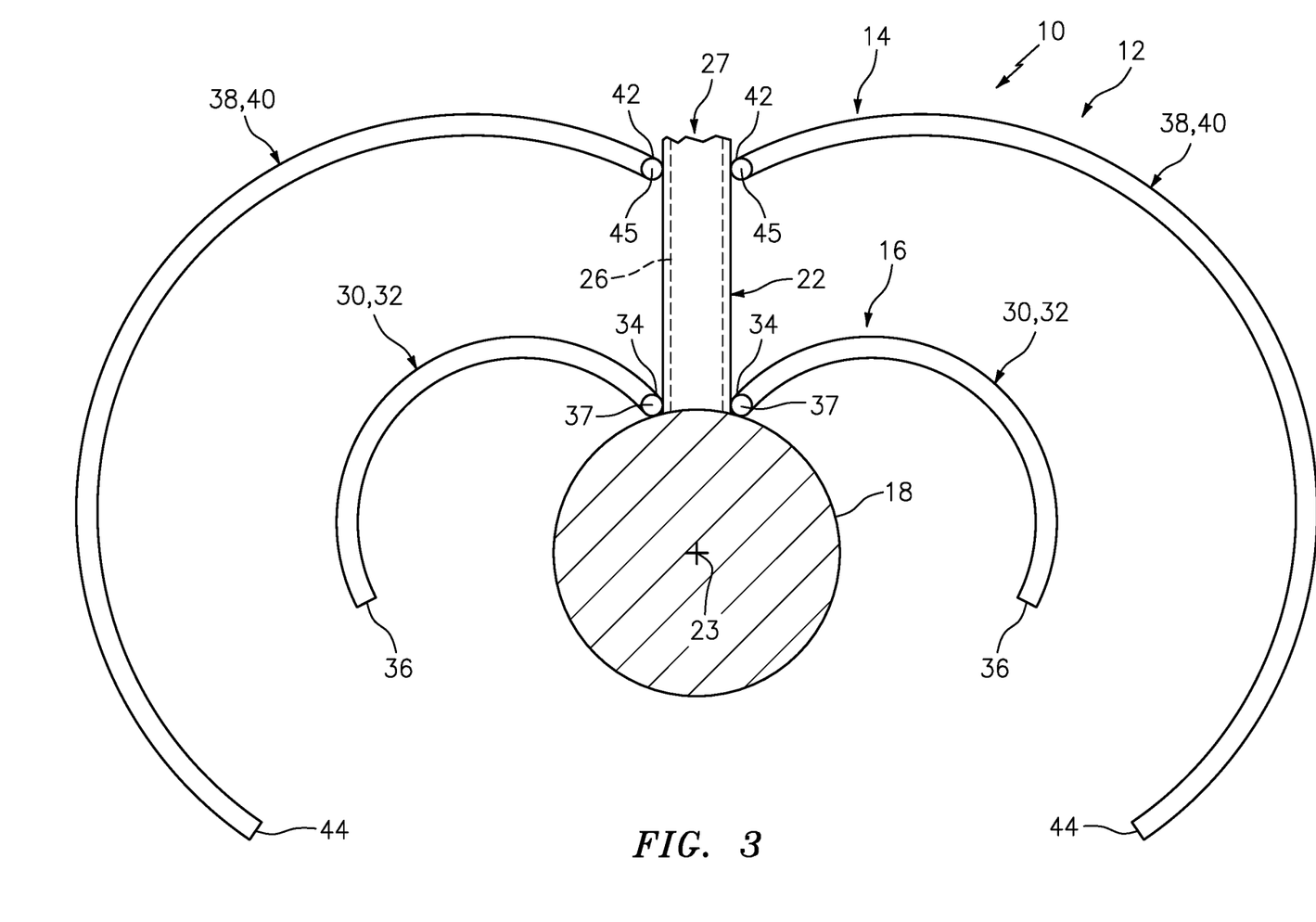
FIG. 3 is a cross-sectional illustration of the aircraft propulsion system with the cowl doors in open positions.

Referring still to FIG. 2, the inner structure 16 may be configured with one or more movable (e.g., pivotable) inner structure components 30. These inner structure components 30 may be configured as or otherwise include inner cowl doors 32. Each of these inner cowl doors 32 extends circumferentially about the axial centerline 23. In particular, each inner cowl door 32 extends circumferentially between an inner cowl first (e.g., upper) end 34 and an inner cowl second (e.g., lower) end 36. The inner cowl first end 34 may be pivotally connected to the fixed structure 27 (e.g., the bifurcation structure 22 and/or the pylon 26) by, for example, a hinge at a pivot point 37. Each inner cowl door 32 is thereby operable to move (e.g., pivot about the pivot point 37) between an inner cowl door closed position (position of FIG. 2) and an inner cowl door open position (position of FIG. 3). Referring again to FIG. 2, the inner cowl second ends 36 of the inner cowl doors 32 may be configured to latch together so as to at least partially or completely form the inner barrel 20.

The outer structure 14 may be configured with one or more movable (e.g., pivotable) outer structure components 38. These outer structure components 38 may be configured as or otherwise include outer cowl doors 40. Each of these outer cowl doors 40 extends circumferentially about the axial centerline 23. In particular, each outer cowl door 40 extends circumferentially between an outer cowl first (e.g., upper) end 42 and an outer cowl second (e.g., lower) end 44. The outer cowl first end 42 may be pivotally connected to the fixed structure 27 (e.g., the bifurcation structure 22 and/or the pylon 26) by, for example, a hinge at a pivot point 45. Each outer cowl door 40 is thereby operable to move (e.g., pivot about the pivot point 45) between an outer cowl door closed position (position of FIG. 2) and an outer cowl door open position (position of FIG. 3). Referring again to FIG. 2, the outer cowl second ends 44 of the outer cowl doors 40 may be configured to latch together so as to at least partially or completely form, for example, a translatable sleeve of the outer structure 14.

Figure 4:
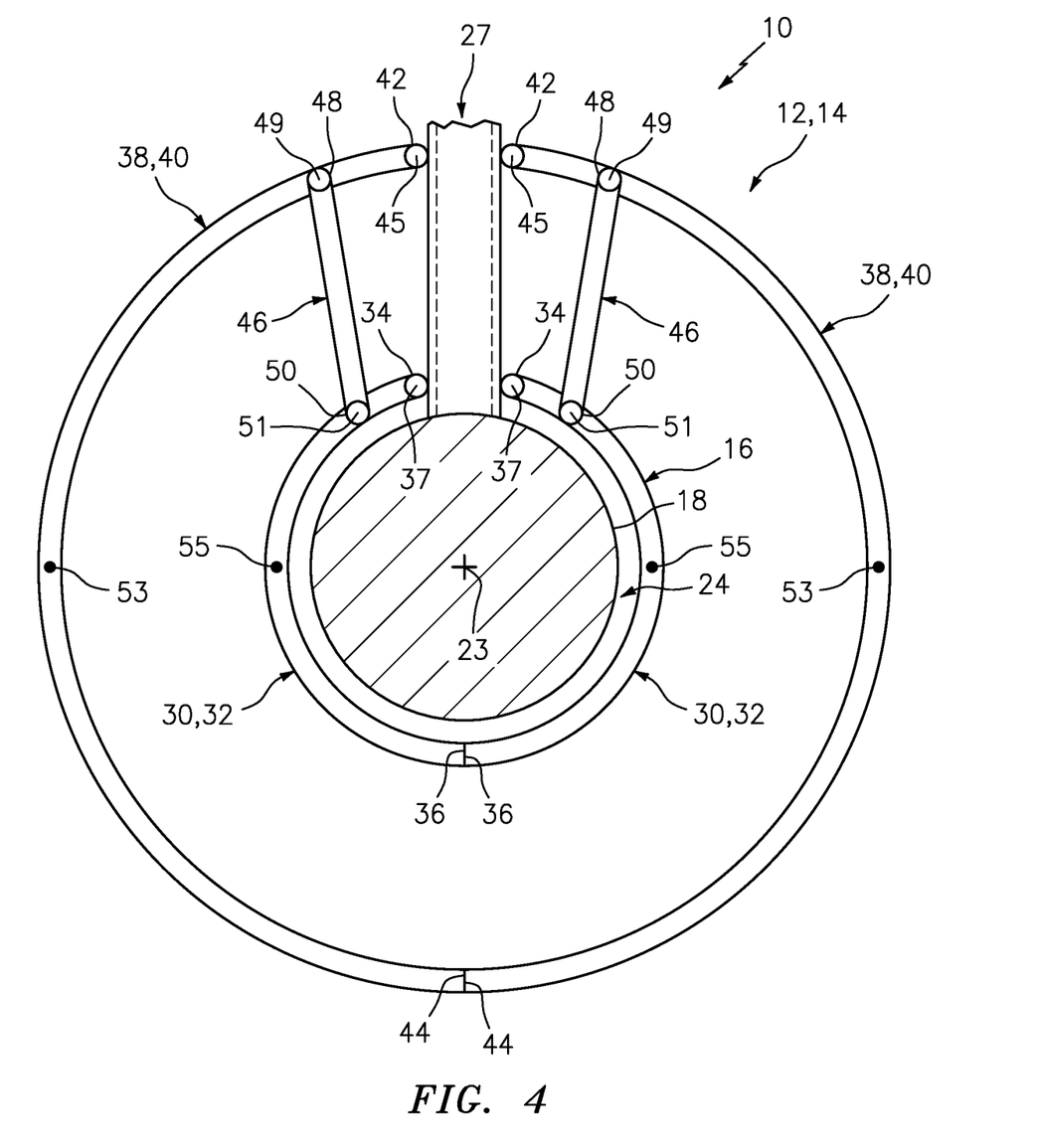
FIG. 4 is a cross-sectional illustration of the aircraft propulsion system of FIG. 2 configured with one or more linkages.
Figure 5:
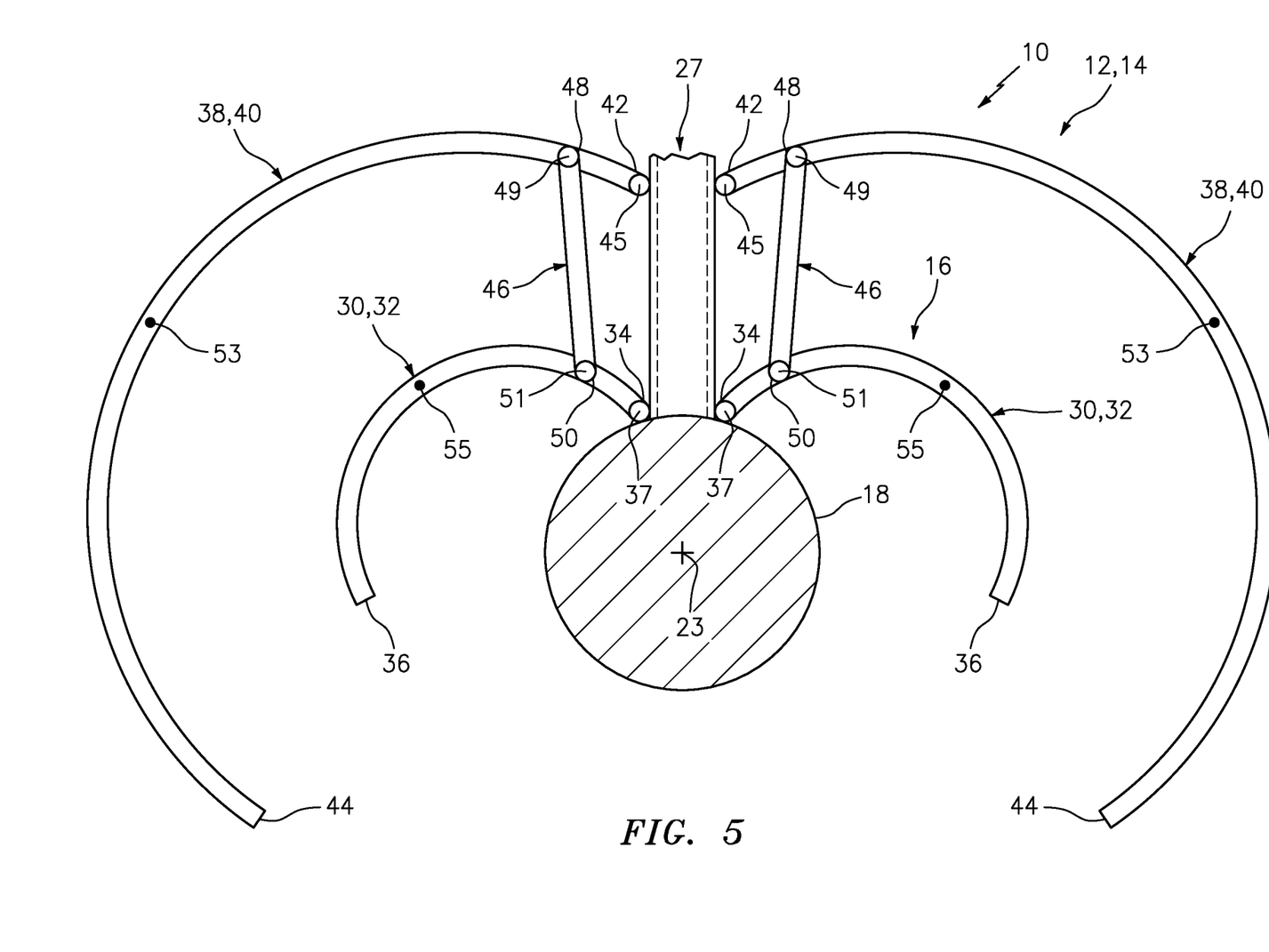
FIG. 5 is a cross-sectional illustration of the aircraft propulsion system of FIG. 3 configured with the one or more linkages.

Referring to FIGS. 4 and 5, to assist and/or otherwise facilitate in the opening of and/or the closing of and/or the holding of the components 30 and/or 38 (e.g., the cowl doors 32 and/or 40), the nacelle 12 may be configured with one or more linkages 46. Each of these linkages 46 is connected to a respective one of the outer structure components 38 (e.g., outer cowl doors 40) and a respective one of the inner structure components 30 (e.g., inner cowl doors 32). A first (e.g., outer) end 48 of each linkage 46 of FIGS. 4 and 5, for example, is moveably (e.g., pivotally) connected to the respective outer cowl door 40 at a first connection point 49 (e.g., an outer pivot point) via a first pivot joint; e.g., an outer pin connection. A second (e.g., inner) end 50 of each linkage 46 of FIGS. 4 and 5 is moveably (e.g., pivotally) connected to the respective outer cowl door 40 at a second connection point 51 (e.g., an inner pivot point) via a second pivot joint; e.g., an inner pin connection. Each linkage 46 extends (e.g., radially) between the respective outer cowl door 40 and the respective inner cowl door 32. In the specific embodiment of FIGS. 4 and 5, each linkage 46 completes a four-bar mechanism between the components 27, 30/32 and 38/40.

Each linkage 46 may be arranged proximate the fixed structure 27; e.g., the bifurcation structure 22 and/or the pylon 26. Each linkage 46, for example, may be arranged closer to the fixed structure 27 than the ends 36 and/or 44. In some embodiments, the first connection point 49 is located circumferentially along the component 38, 40 between the end 42 and a circumferential midpoint 53 (e.g., center) of the component 38, 40, which midpoint 53 may be located circumferentially (e.g., halfway) along the component 38, 40 between its ends 42 and 44. The connection point 49 of FIGS. 4 and 5, for example, is located circumferentially closer to the end 42 than the midpoint 53. In addition or alternatively, the second connection point 51 is located circumferentially along the component 30, 32 between the end 34 and a circumferential midpoint 55 (e.g., center) of the component 30, 32, which midpoint 55 may be located circumferentially (e.g., halfway) along the component 30, 32 between its ends 34 and 36. The connection point 51 of FIGS. 4 and 5, for example, is located circumferentially closer to the end 34 than the midpoint 55. The present disclosure, however, is not limited to such an exemplary linkage 46 location. For example, in other embodiments, the linkages 46 may be located circumferentially towards the midpoints 53, 55.

Figure 6:
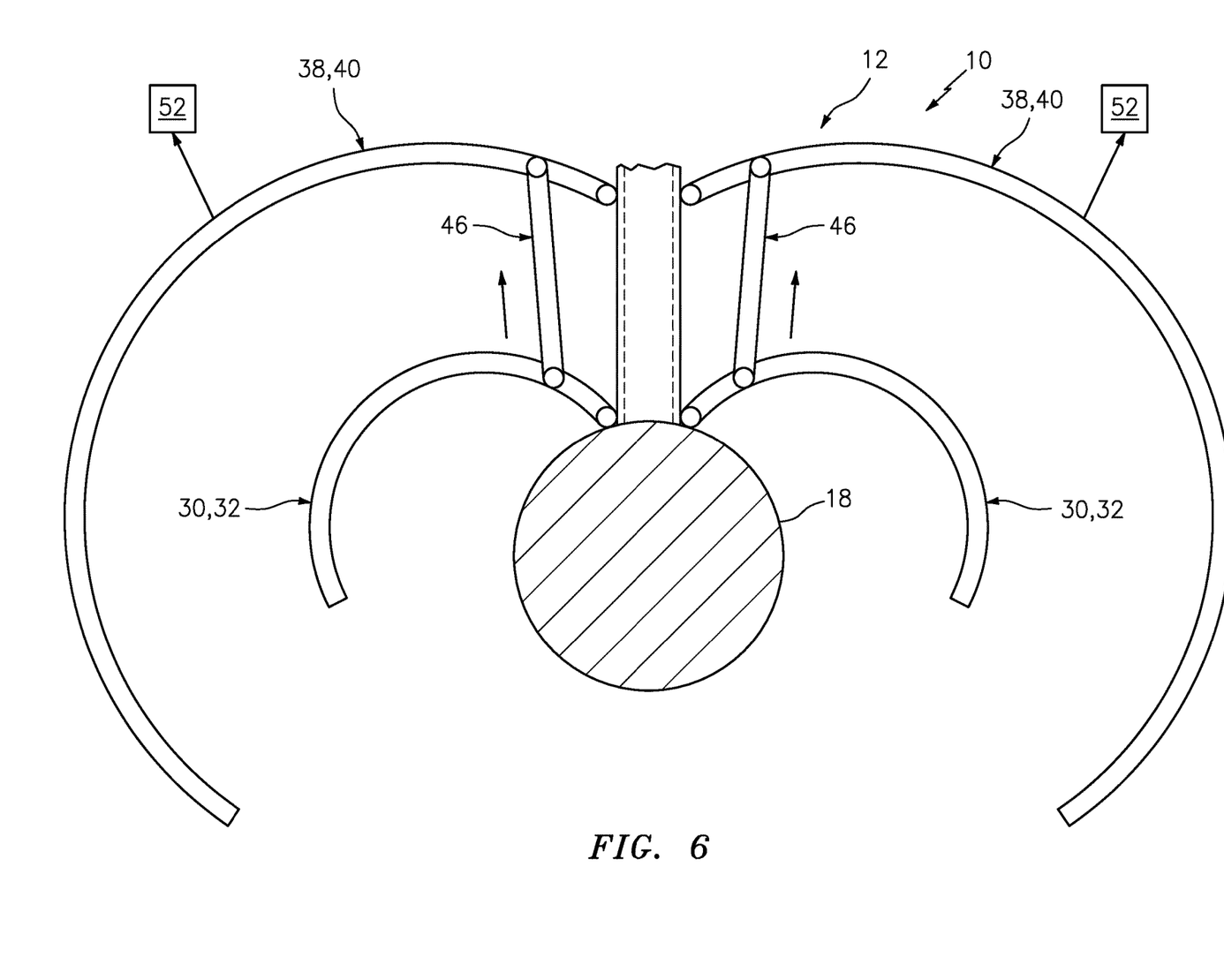
FIG. 6 is a cross-sectional illustration of the aircraft propulsion system of FIG. 5 configured with one or more actuators for outer cowl doors.
Figure 7:
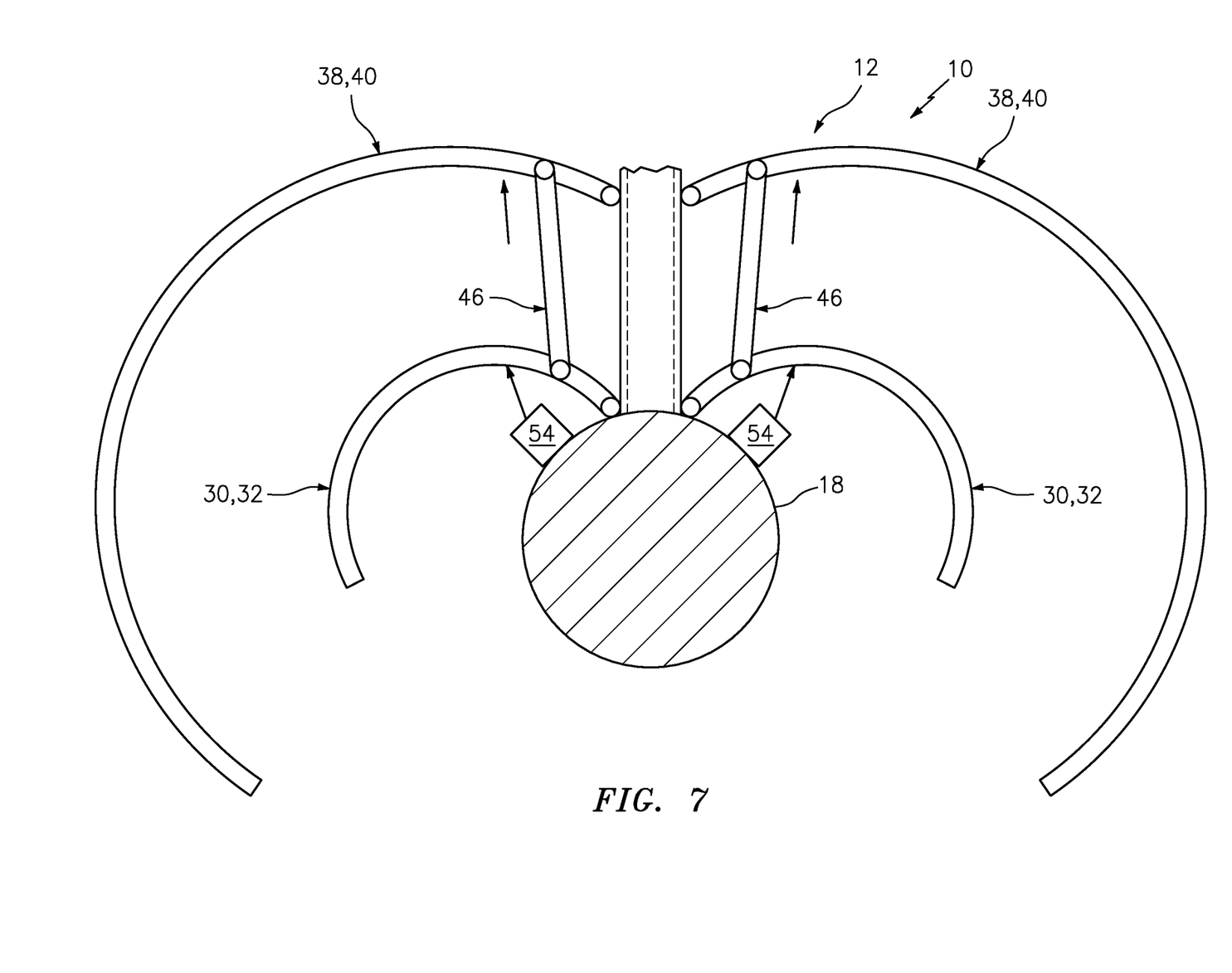
FIG. 7 is a cross-sectional illustration of the aircraft propulsion system of FIG. 5 configured with one or more actuators for inner cowl doors.

Each linkage 46 is configured to link movement (e.g., pivoting) of the respective outer structure component 38 (e.g., outer cowl door 40) and the respective inner structure component 30 (e.g., inner cowl door 32). For example, in the embodiment of FIG. 6, if the outer cowl doors 40 are pulled or otherwise opened (e.g., via one or more actuators 52 located, for example, outside of the nacelle 12), then the linkages 46 will pull the inner cowl doors 32 open (e.g., concurrently) with the outer cowl doors 40. In the embodiment of FIG. 7, if the inner cowl doors 32 are pushed or otherwise opened (e.g., via one or more actuators 54 located, for example, within the nacelle (e.g., configured with the engine core 18)), then the linkages 46 will push the outer cowl doors 40 open (e.g., concurrently) with the inner cowl doors 32.

In some embodiments, referring to FIGS. 4 and 5, one or each linkage 46 may be configured as a single rigid link such as, but not limited to, a push (or pull) rod. With such a configuration, each linkage 46 may have a longitudinal fixed length.

Figure 8:
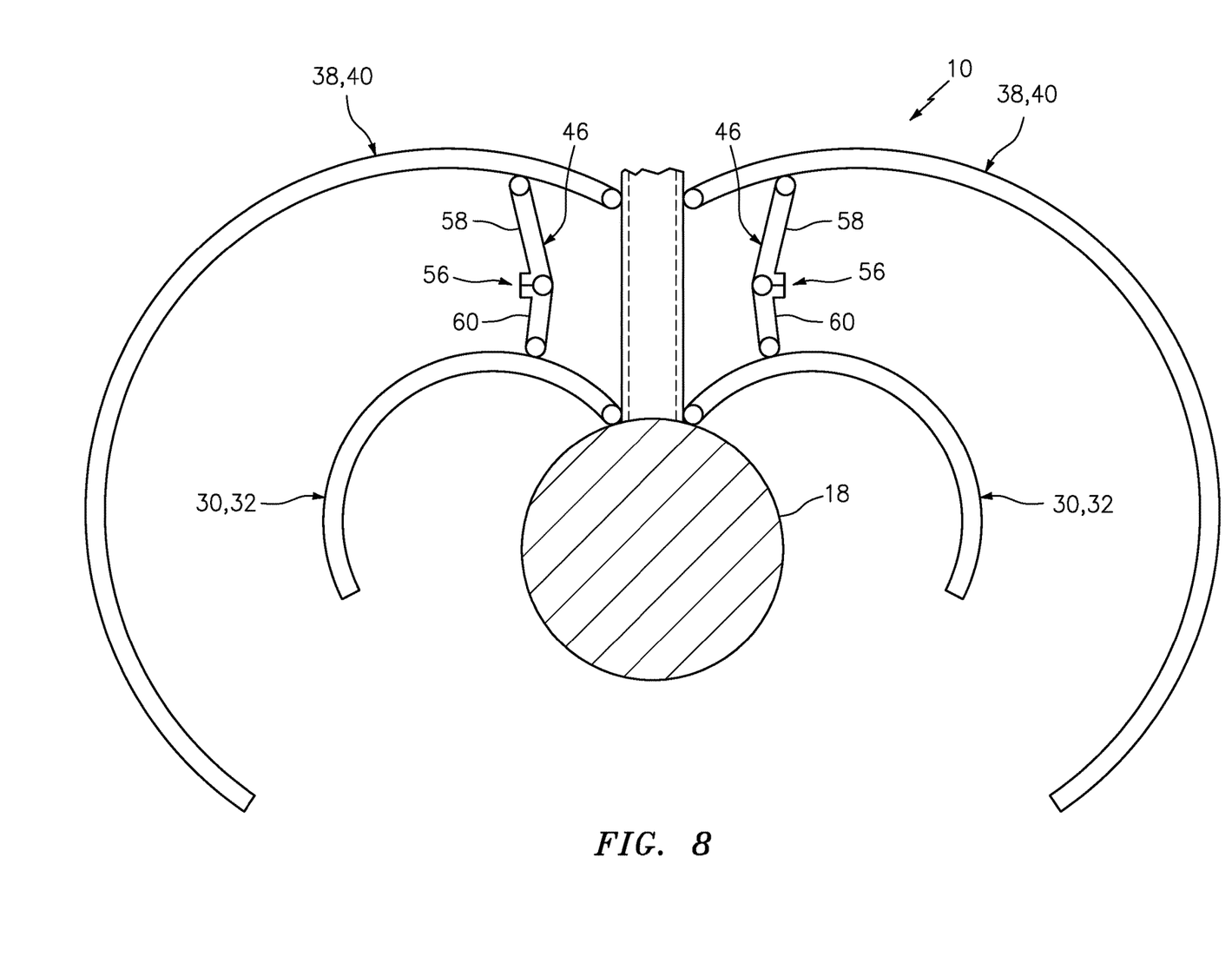
FIG. 8 is a cross-sectional illustration of the aircraft propulsion system of FIG. 3 configured with one or more alternative linkages.

In some embodiments, referring to FIG. 8, one or each linkage 46 may be configured with a lock 56; e.g., a locking mechanism. Each linkage 46 of FIG. 8, for example, may include two (e.g., fixed or variable length) links 58 and 60 configured to provide an over-center lock when those links 58 and 60 are over extended. With such a configuration, each linkage 46 may have a longitudinal variable length.

In some embodiments, one or each linkage 46 may be permanently mounted with the cowl doors 32, 40. In other words, the linkages 46 may remain mounted with the cowl doors 32, 40 during turbine engine operation. However, in other embodiments, one or each linkage 46 may be removably mounted with the cowl doors 32, 40 such that those linkages 46 are removed for turbine engine operation. Thus, the linkages 46 may be installed only for turbine engine maintenance and/or inspection.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a fixed structure;
   an inner cowl door extending circumferentially between a first end and a second end with a midpoint halfway circumferentially along the inner cowl door between the first end and the second end, the inner cowl door pivotally connected to the fixed structure at the first end;
   an outer cowl door pivotally connected to the fixed structure, the outer cowl door radially outboard of and overlapping the inner cowl door; and
   a linkage extending between and movably connected to the inner cowl door and the outer cowl door, the linkage arranged proximate the fixed structure, the linkage pivotally connected to the inner cowl door at a connection point circumferentially between the midpoint and the first end, and the connection point forming a pivot axis between the linkage and the inner cowl door circumferentially between the midpoint and the first end.

2. The assembly of claim 1, wherein the connection point is circumferentially closer to the first end than the midpoint.

3. The assembly of claim 1, wherein
   the outer cowl door extends circumferentially between an outer cowl door first end and an outer cowl door second end with an outer cowl door midpoint halfway circumferentially along the outer cowl door between the outer cowl door first end and the outer cowl door second end;
   the outer cowl door is pivotally connected to the fixed structure at the outer cowl door first end; and
   the linkage is pivotally connected to the outer cowl door at an outer connection point circumferentially between the outer cowl door midpoint and the outer cowl door first end, and the outer connection point forms an outer pivot axis between the linkage and the outer cowl door circumferentially between the outer cowl door midpoint and the outer cowl door first end.

4. The assembly of claim 3, wherein the outer connection point is circumferentially closer to the outer cowl door first end than the outer cowl door midpoint.

5. The assembly of claim 1, wherein the linkage is configured to push against and thereby open the outer cowl door as the inner cowl door is opened.

6. The assembly of claim 1, wherein the linkage is configured to pull against and thereby open the inner cowl door as the outer cowl door is opened.

7. The assembly of claim 1, further comprising a lock configured to lock a position of the linkage.

8. The assembly of claim 1, wherein the linkage has a fixed length.

9. The assembly of claim 1, wherein the linkage has a variable length.

10. The assembly of claim 1, further comprising an actuator configured to push open the inner cowl door.

11. The assembly of claim 1, further comprising an actuator configured to pull open the outer cowl door.

12. The assembly of claim 1, wherein a portion of a bypass flowpath within the aircraft propulsion system is formed by and extends radially between the inner cowl door and the outer cowl door.

13. The assembly of claim 1, further comprising:
a nacelle outer structure comprising the outer cowl door; and
a nacelle inner structure comprising the inner cowl door.

14. An assembly for an aircraft propulsion system, comprising:
a first structure;
a nacelle inner structure comprising an inner structure component, the inner structure component pivotally connected to the first structure at an inner structure pivot point, and the inner structure component configured to pivot about the inner structure pivot point between an inner structure component closed position and an inner structure component open position;
a nacelle outer structure extending circumferentially about and overlapping the nacelle inner structure, the nacelle outer structure comprising an outer structure component, the outer structure component pivotally connected to the first structure, and the outer structure component configured to pivot between an outer structure component closed position and an outer structure component open position; and
a linkage extending between and pivotally connected to the inner structure component at an inner pivot point and the outer structure component at an outer pivot point, the inner pivot point located circumferentially along the inner structure component between a circumferential midpoint of the inner structure component and the inner structure pivot point.

15. The assembly of claim 14, wherein the inner structure component comprises an inner cowl door.

16. The assembly of claim 14, wherein the outer structure component comprises an outer cowl door.

17. The assembly of claim 14, wherein the first structure comprises a fixed structure.

18. An assembly for an aircraft propulsion system, comprising:
a first structure;
a nacelle inner structure comprising an inner structure component, the inner structure component pivotally connected to the first structure, and the inner structure component configured to pivot between an inner structure component closed position and an inner structure component open position;
a nacelle outer structure extending circumferentially about and overlapping the nacelle inner structure, the nacelle outer structure comprising an outer structure component, the outer structure component pivotally connected to the first structure at an outer structure pivot point, and the outer structure component configured to pivot about the outer structure pivot point between an outer structure component closed position and an outer structure component open position; and
a linkage extending between and pivotally connected to the inner structure component at an inner pivot point and the outer structure component at an outer pivot point, the outer pivot point located circumferentially along the outer structure component between a circumferential midpoint of the outer structure component and the outer structure pivot point.

* * * * *